Jan. 15, 1929.  1,699,139
W. A. FULD
TOY
Filed Jan. 5, 1928  2 Sheets-Sheet 1
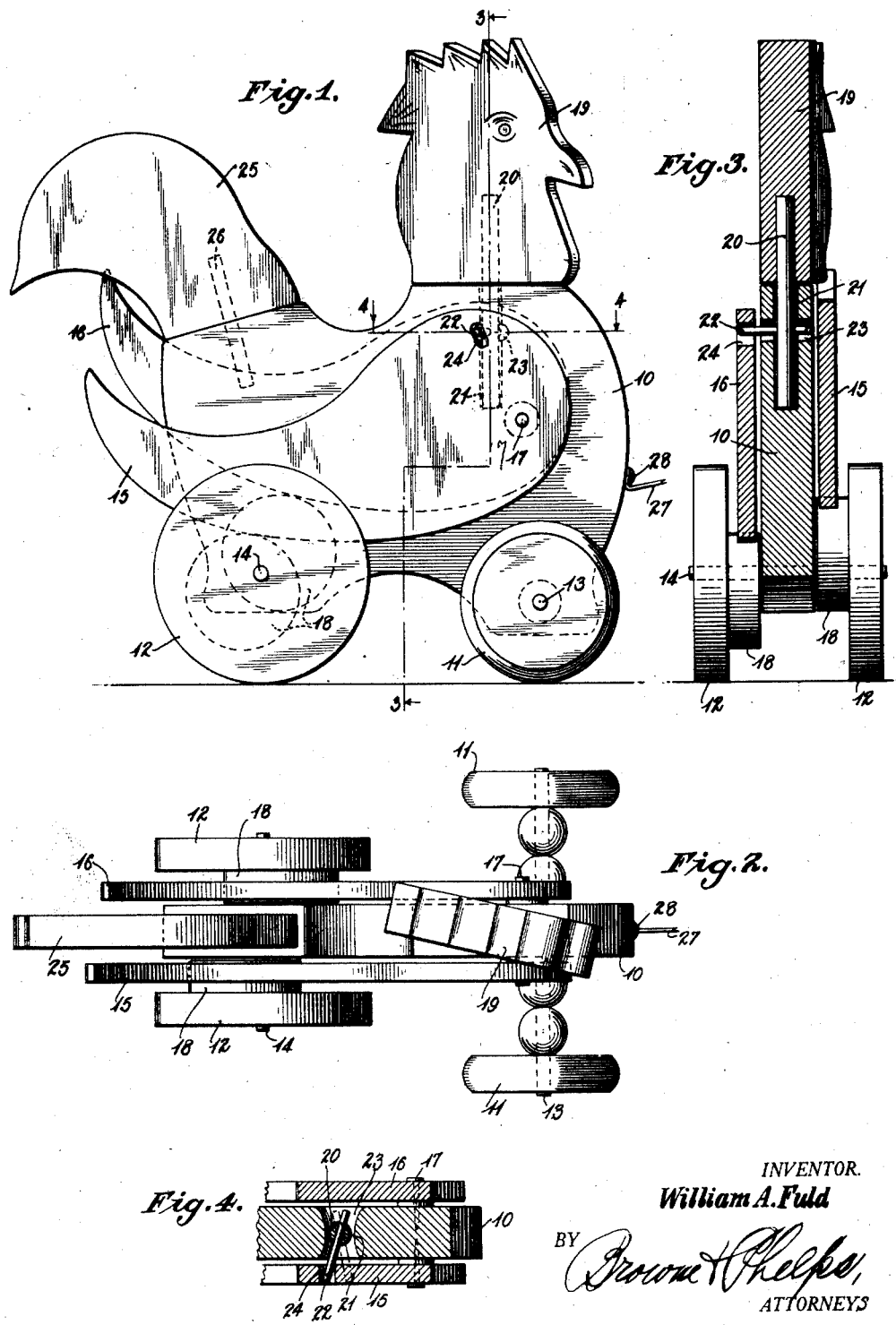
INVENTOR.
William A. Fuld
BY
ATTORNEYS Jan. 15, 1929.
W. A. FULD
TOY
1,699,139
Filed Jan. 5, 1928      2 Sheets-Sheet 2
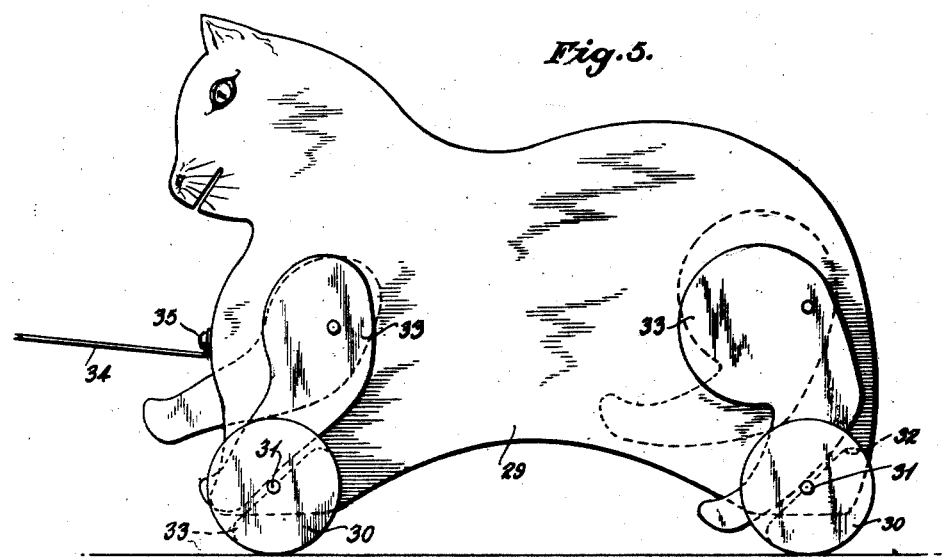
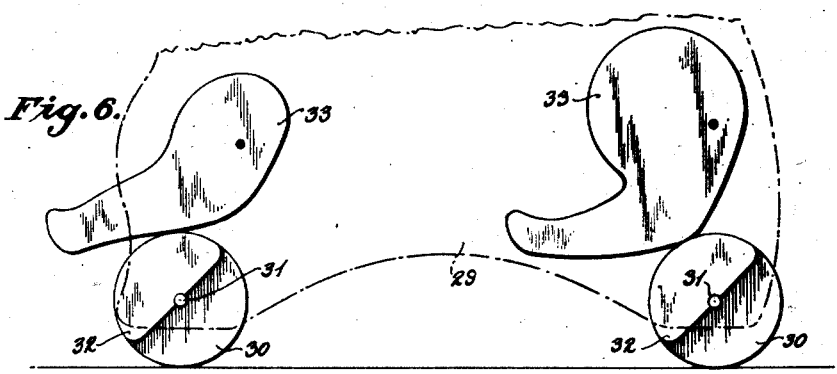
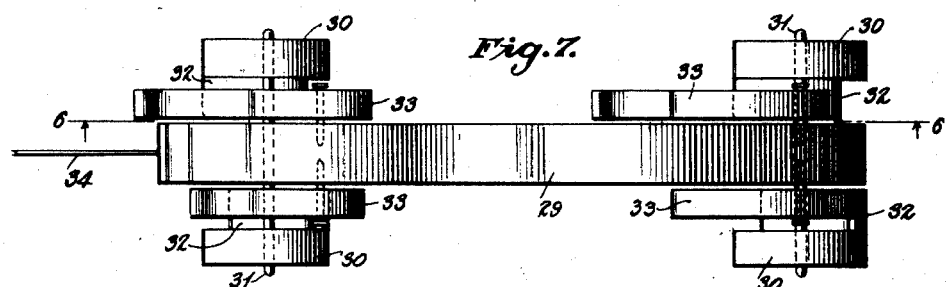
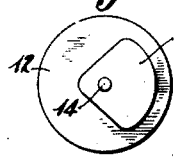
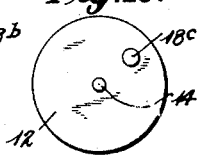
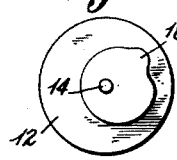
INVENTOR.
William A. Fuld
BY
ATTORNEYS Patented Jan. 15, 1929

1,699,139

UNITED STATES PATENT OFFICE.

WILLIAM A. FULD, OF BALTIMORE, MARYLAND.

TOY.

Application filed January 5, 1928. Serial No. 244,671.

This invention relates to toys and has among its objects the provision of a toy animal or bird, which, when drawn along a supporting surface will impart a life-like movement to certain of or all the limbs.

Another object of the invention is the provision of means whereby a movement from side to side of the head is made synchronous with the motion of the limbs.

Another object of the invention is the actuation of the head from one of the limbs.

Still another object of the invention is the provision of spacers for certain of the supporting wheels which spacers also serve as the means for actuating the limbs.

Illustrative embodiments of the invention are shown in the accompanying drawings in which Fig. 1 is a side elevation of a fowl;

Fig. 2 is a top plan view of the fowl shown in Fig. 1;

Fig. 3 is a vertical cross-section taken on line 3—3 of Fig. 1;

Fig. 4 is a detail sectional view taken on line 4—4 of Fig. 1;

Fig. 5 is a side elevation of an animal showing the limbs on one side in one position of the actuating members;

Fig. 6 is a broken side elevation showing the limbs on the other side of the animal taken on line 6—6 of Fig. 7;

Fig. 7 is a plan view of the animal shown in Fig. 5;

Figs. 8, 9 and 10 are details of modifications of the limb actuating members.

Referring to the drawings more specifically, and in detail, 10 is the body of a fowl supported on fore wheels 11, mounted on axle 13 and rear wheels 12 mounted on axle 14. The body has wings 15 and 16 loosely mounted on a pivot or journal member 17. The pivot member 17 may be a single journal member or may be two separate bearing studs individually secured to the body 10. The wings are caused to move up and down by reason of the fact that the rear portions of wings rest on members 18 secured to wheels 13 eccentric to the axles thereof. These members 10 may be in the form of circular disks positioned off center with respect to axle as indicated in Fig. 1, or half-circle cams, segmental cams, irregular circular cams, or pins, as shown in Figs. 6, 8, 9 and 10, respectively.

The head 19 is rigidly mounted on a pin or rod 20, which pin rests loosely in an opening 21 formed in body 10. Pin 20 is provided with a bearing pin 22 on that part which is housed in opening 21. This bearing pin 22 extends through an opening 23 cut through body 10 to intersect opening 21. One arm of said pin 22 projects through a cam-slot 24 in limb 15, and so rides therein that when the toy is moved over its support the vertical movement of the wing causes the head to move from side to side.

The tail 25 is so secured to the body by a dowel 26 that it may be set at any desired angle in its plane of rotation. A cord or other flexible article 27 is secured to the body by suitable means such as pin 28.

In Figs. 5, 6 and 7 I have shown my invention as applied in the simulation of a four footed animal. In this form of my invention the body 29 is supported on solid wheels 30, which in turn are mounted rigidly on shafts 31, which shafts are mounted to rotate freely in their respective journal holes in the body. To wheels 30 are secured cam-members 32, which in addition to giving a life-like motion to the limbs 33, also act as spacers to give a sufficiently wide support to the animal to prevent its being readily overturned. The cam members on each shaft 31 are mounted 180° apart with respect to each other so that when the limb on one side is at its lowest position the corresponding limb on the other side is in its highest position. The cams actuating the fore and hind legs are capable of being so adjusted that when the fore leg is at its highest position the hind leg on the same side is at its lowest position. A flexible member 34 is secured to the body as at 35 for the purpose of drawing the toy along its supporting surface.

While I have shown circular cams, and half circular cams, as the means for actuating the limbs, it is obvious that many other means may be used to transform the continuous circular motion of the drive wheels into oscillating motion for the limbs, and in Figs. 8, 9 and 10 are shown several of such other means. Their operation is obvious from the figures.

With special reference to that form of my toy shown in Figs. 1, 2, 3 and 4, the operation of the toy is as follows: The toy is pulled along the floor, or other support, by means of cord 27. This causes wheels 12 to rotate. The spacer cams 18 are thus rotated, and since the wings 15 and 16 rest freely thereon, these wings are alternately raised and lowered as the toy is drawn along. As the wing 15 moves up and down about its pivot 17 the cam slot is oscillated back and forth thus imparting an oscillating motion to pin 22, which causes pin 20 to move back and forth horizontally. This movement of pin 20 causes the head to move from side to side.

With respect to the animal shown in Figs. 5, 6 and 7 the legs are actuated in the same manner as the wings in the fowl form of my device.

Minor changes in the various parts of the toys come within the scope of the invention as defined in the appended claims.

I claim:

1. A toy comprising, in combination, a vertical body, front and rear shafts journaled therein, wheels rigidly mounted on said shafts, cams fixed to the inner surfaces of certain of said wheels, bearing members on said body, and elongated limbs mounted on said bearing members on opposite sides of the body having portions remote from said bearing members loosely resting directly on said cams, whereby a life-like motion is imparted to said limbs when the toy is moved along a support.

2. A toy comprising, in combination, a body, front and rear shafts journaled therein, wheels rigidly mounted on said shafts, cams fixed to the wheels on one of said shafts, said cams being out of register, bearing members on said body, and horizontally elongated limbs mounted on said bearing members having portions remote from said bearing members loosely resting on said cams, whereby a life-like motion is imparted to said limbs when the toy is moved along a support, said cams being completely within and spaced from the periphery of the wheels to which they are fixed and so that the limbs will always be overlapped by the latter wheels.

3. A toy comprising, in combination, a body, shafts journalled therein supporting wheels fixed to said shafts, cams fixed to certain of said shafts, limbs pivotally mounted on opposite sides of said body having portions resting loosely on said cams, a movable head, and means whereby when one of the limbs is moved the head is caused to move laterally.

4. A toy comprising, in combination, a body, front and rear shafts journalled therein, wheels rigidly mounted on said shafts, cams fixed to the wheels on the rear shaft, bearing members on said body, limbs mounted on said bearing members and having portions resting loosely on said cams, a movable head, and means carried by said head engaging a slot in a limb whereby motion of the limb causes motion of the head about an axis normal thereto.

5. A toy comprising, in combination, a body, a vertically movable limb pivoted to one side thereof, means to move said limb, a head having a rod thereon depending into and journaled in a substantially vertical opening of the body, a pin secured at one side of the center of its length to said rod and securing the same against displacement from the body, said pin having one of its ends projecting laterally from said body, and said limb having a cam slot engaged by said pin whereby when the limb is moved the head will be moved thereby.

6. A toy comprising, in combination, a body, a vertically movable limb pivoted to one side of the body adjacent the front thereof, wheels on which the body is mounted, a cam carried at the inner surface of one of said wheels, said limb being horizontally elongated and resting loosely on said cam whereby the limb will be moved, a head having a rod thereon depending into and journaled in a substantially vertical opening of the body, a pin securing the rod against displacement from the body and projecting laterally from the same, and said limb having a cam slot above its axis, said slot being engaged by said pin whereby when the limb is moved the head will be moved thereby.

WILLIAM A. FULD.